(12) United States Patent
Xu

(10) Patent No.: US 9,087,469 B2
(45) Date of Patent: Jul. 21, 2015

(54) METHODS AND SYSTEMS FOR AUTOMATICALLY SWITCHING MONITOR SCENE MODES

(75) Inventor: Shuang Xu, Shenzhen (CN)

(73) Assignee: NVIDIA Corporation, Santa Clara, CA (US)

( * ) Notice: Subject to any disclaimer, the term of this patent is extended or adjusted under 35 U.S.C. 154(b) by 801 days.

(21) Appl. No.: 12/819,145

(22) Filed: Jun. 18, 2010

(65) Prior Publication Data

US 2010/0321396 A1 Dec. 23, 2010

(30) Foreign Application Priority Data

Jun. 18, 2009 (CN) .......................... 2009 1 0147728

(51) Int. Cl.
 *G09G 5/36* (2006.01)
 *G09G 5/00* (2006.01)
 *G09G 5/06* (2006.01)
 *G06F 3/14* (2006.01)

(52) U.S. Cl.
 CPC ........ *G09G 5/003* (2013.01); *G06F 3/14* (2013.01); *G09G 5/363* (2013.01); *G09G 2320/0613* (2013.01); *G09G 2320/08* (2013.01); *G09G 2370/047* (2013.01)

(58) Field of Classification Search
 None
 See application file for complete search history.

(56) References Cited

U.S. PATENT DOCUMENTS

| 7,675,574 | B2 | 3/2010 | Ishii et al. | |
|---|---|---|---|---|
| 7,812,849 | B2 | 10/2010 | Zhang et al. | |
| 7,889,202 | B2 | 2/2011 | Zhang et al. | |
| 7,903,120 | B2 | 3/2011 | Zhang | |
| 8,108,879 | B1* | 1/2012 | Garlick et al. | 718/108 |
| 2005/0266923 | A1 | 12/2005 | Ishii et al. | |
| 2007/0088856 | A1 | 4/2007 | Zhang | |
| 2007/0091097 | A1 | 4/2007 | Zhang | |
| 2007/0091098 | A1 | 4/2007 | Zhang et al. | |
| 2007/0091099 | A1 | 4/2007 | Zhang et al. | |
| 2007/0195109 | A1* | 8/2007 | Paquette | 345/601 |
| 2008/0055228 | A1* | 3/2008 | Glen | 345/102 |
| 2010/0128064 | A1* | 5/2010 | Taylor et al. | 345/690 |

FOREIGN PATENT DOCUMENTS

| CN | 1629778 A | 6/2005 |
|---|---|---|
| CN | 1991904 A | 7/2007 |
| CN | 101027714 A | 8/2007 |

OTHER PUBLICATIONS

Office Action from Chinese Patent Application No. 200910147728.6, dated Jun. 5, 2012.
Office Action from Chinese Patent Application No. 200910147728.6, dated Jan. 14, 2013.
Office Action from Chinese Patent Application No. 200910147728.6, dated Jun. 7, 2013.

* cited by examiner

*Primary Examiner* — Xiao Wu
*Assistant Examiner* — Matthew D Salvucci
(74) *Attorney, Agent, or Firm* — Zilka-Kotab, PC

(57) ABSTRACT

Systems and methods for automatically switching scene modes of a monitor may comprise processes and corresponding modules for sending a request to a driver to activate hardware modules of a graphics processing unit (GPU) based on a requirement of a launched application program and then recording identifiers of the activated hardware modules on a list. A record of a scene mode associated with one or more activated hardware modules on the list is located within a scene mode profile table and then the corresponding monitor parameters previously associated with the scene mode are read. The monitor is then automatically adjusted according to the monitor parameters read.

22 Claims, 3 Drawing Sheets

METHODS AND SYSTEMS FOR AUTOMATICALLY SWITCHING MONITOR SCENE MODES

CLAIM OF PRIORITY

The present application claims the priority of Chinese Patent Application filed Jun. 18, 2009 under application number 200910147728.6, which is incorporated herein by reference.

FIELD OF INVENTION

The present invention relates to a monitor display, and more particularly to a method and system for automatically switching monitor scene modes.

BACKGROUND OF THE INVENTION

Generally, display parameters for a monitor, such as brightness, chromaticity, contrast and white balance, etc., will be preset when the monitor is manufactured. After the monitor is put into use, the user usually may set and adjust these parameters again to obtain optimal display of the current application's content. For example, when browsing a website or processing texts, a user may need lower brightness and contrast for the monitor, while higher brightness and color saturation may be necessary for watching movies. Some monitors may be provided with several preset "Scene Modes" to meet the users' different requirements of the monitor. A scene mode is a set of preset parameters for adjusting the monitor including, but not limited to, brightness, chromaticity, white balance and contrast, etc. Different scene modes are suitable for displaying different corresponding content. The scene mode is convenient for the user to adapt the monitor to the content being displayed, since the user will not need to adjust the respective parameters separately.

There are currently two types of scene control mechanisms for monitors: analog and digital. The analog control mechanism is mainly applied to the conventional cathode ray tube (CRT) monitor. The adjustment is performed by controlling the quantity of electrons emitted by the cathode of the kinescope (i.e, by manually turning control knobs provided on the monitor). This way of adjustment is relative simple, but has lower precision and cannot store any scene modes. The digital control mechanism, for example, may be applied to a liquid crystal display (LCD) monitor. The adjustment is performed by changing the voltage applied to the liquid crystal molecules, thereby making them rearrange, and then changing the light transmission of the LC molecules in order to obtain a desired display effect. Adjustment input mechanisms such as touch panels, knobs, buttons, and jog/shuttle controllers are commonly used in LCDs. Additionally, a memory for storing a variety of preset scene modes may be provided inside an LCD monitor. The user may select and switch to a certain scene mode based on the displayed content of the currently running application. However, regardless of which display mechanism is applied, the user must adjust the parameters or switch the scene mode manually.

FIG. 1 shows a conventional way of selecting a scene mode for a monitor 100. The user may push the button MENU 102 arranged on the bottom of the monitor 100 to select a desired scene mode as needed. For example, different scene modes may be selected for playing 3D games, web browsing and playing high definition (HD) movies. Then a set of parameters 101 corresponding to the selected scene mode will pop up on the monitor 100, including preset brightness, chromaticity and contrast. The monitor 100 will be adjusted based on the above set of parameters 101 to obtain a desired display effect. However, when the user pushes the buttons 102-104 to select a scene mode, the user must divert their attention away from the currently running application or suspend running the application, which is not only inconvenient for the user, but may also cause the user to accidentally terminate the application. Another disadvantage is that the user would not be able to select or switch to a desired scene mode if the buttons 102-104 are malfunctioning.

In consideration of above shortcomings, there is a need for methods and systems for automatically switching monitor scene modes to overcome the shortcomings described above and others.

SUMMARY OF THE INVENTION

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

Disclosed is a method and system for automatically switching scene modes are provided to obtain optimal display on a monitor. A method implemented on a computer processor for automatically switching scene modes for a monitor may comprise the sending a request to a driver to activate hardware modules of a graphics processing unit (GPU) based on a requirement of a launched application program and then recording identifiers of the activated hardware modules as a list. A record of a scene mode associated with one or more activated hardware modules on the list is located within a scene mode profile table and then the corresponding monitor parameters previously associated with the scene mode are read. The monitor is then automatically adjusted according to the monitor parameters read.

In another aspect of the invention a system for automatically switching monitor scene modes may comprise a profile table stored in computer memory for defining a plurality of scene modes. Each scene mode has one or more monitor parameter settings and each scene mode corresponds to one or more hardware modules in a graphics processing unit (GPU). A driver implemented on a computer processor is configured for sending a request to activate the hardware modules based on the requirement of a launched application program, recording said activated hardware modules as a list, accessing said profile table and locating a scene mode based on said list and reading corresponding monitor parameters from the profile table associated with the scene mode. There is also a channel for transmitting the monitor parameters to the GPU to automatically switch the monitor to the scene mode by changing monitor settings according to the corresponding monitor parameters.

BRIEF DESCRIPTION OF THE DRAWINGS

The accompanying drawings are included to provide a further understanding of the invention, and are incorporated in and constitute a part of this specification. Methods and systems for automatically switching monitor scene modes are further described with reference to the accompanying drawings in which.

DETAILED DESCRIPTION

Figure 1:
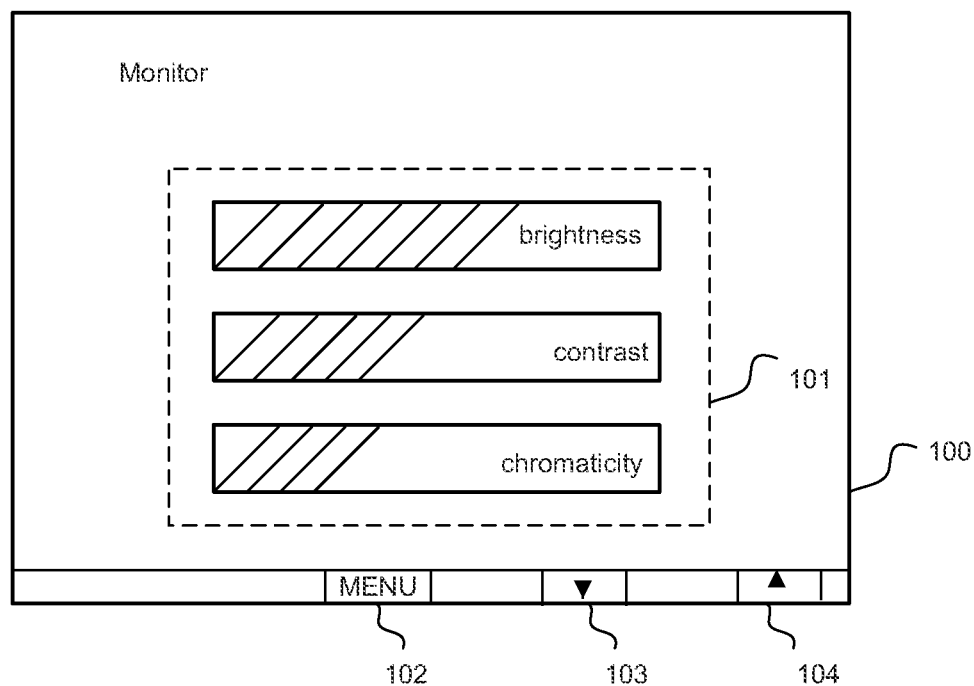
FIG. 1 is a diagram illustrating a conventional interface for selection of monitor scene modes of a monitor.

Certain specific details are set forth in the following description and figures to provide a thorough understanding of various embodiments. Certain well-known details often associated with computing and software technology are not set forth in the following disclosure to avoid unnecessarily obscuring the various embodiments. Further, those of ordinary skill in the relevant art will understand that they can practice other embodiments without one or more of the details described below. Finally, while various methods are described with reference to steps and sequences in the following disclosure, the description as such is for providing a clear implementation of various embodiments, and the steps and sequences of steps should not be taken as required to practice the embodiments.

Aspects of the embodiments described below are operational with numerous other general purpose or special purpose computing environments or configurations. Examples of well known computing systems, environments, and/or configurations that may be suitable for use with the embodiments include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices and the like.

Aspects of the embodiments may be implemented in the general context of computer-executable instructions, such as program modules, being executed by a computer. Generally, program modules include routines, programs, drivers, application programming interfaces (APIs), objects, components, data structures, etc. that perform particular tasks or implement particular abstract data types.

When an application program is launched by a user to run on a computer, it uses the graphics processing unit (GPU) in the computer to call and enable a series of hardware function modules to process and present display contents on the computer monitor based on the requirements of a currently running application program. For example, when a user is launching a 3D video game, a hardware function module, i.e., the 3D game engine, will be called and enabled by the GPU to perform the 3D graphics acceleration function and display the 3D game effect; when a user starts to watch a HD movie, a HD video engine will be called and enabled by the GPU to play the movie smoothly; and when a user starts to explore the Internet or process some texts, GPU will run a basic graphic performance without enabling any specific engine. Therefore, it can be seen from above that the GPU may know what application programs the user is currently running according to the types and status of the graphic hardware engines it enables and then determine what specific scene mode the user may want to use with the currently running application(s). The above provides one example in which a GPU may be utilized to automatically select and switching the scene modes of the monitor.

Figure 2:
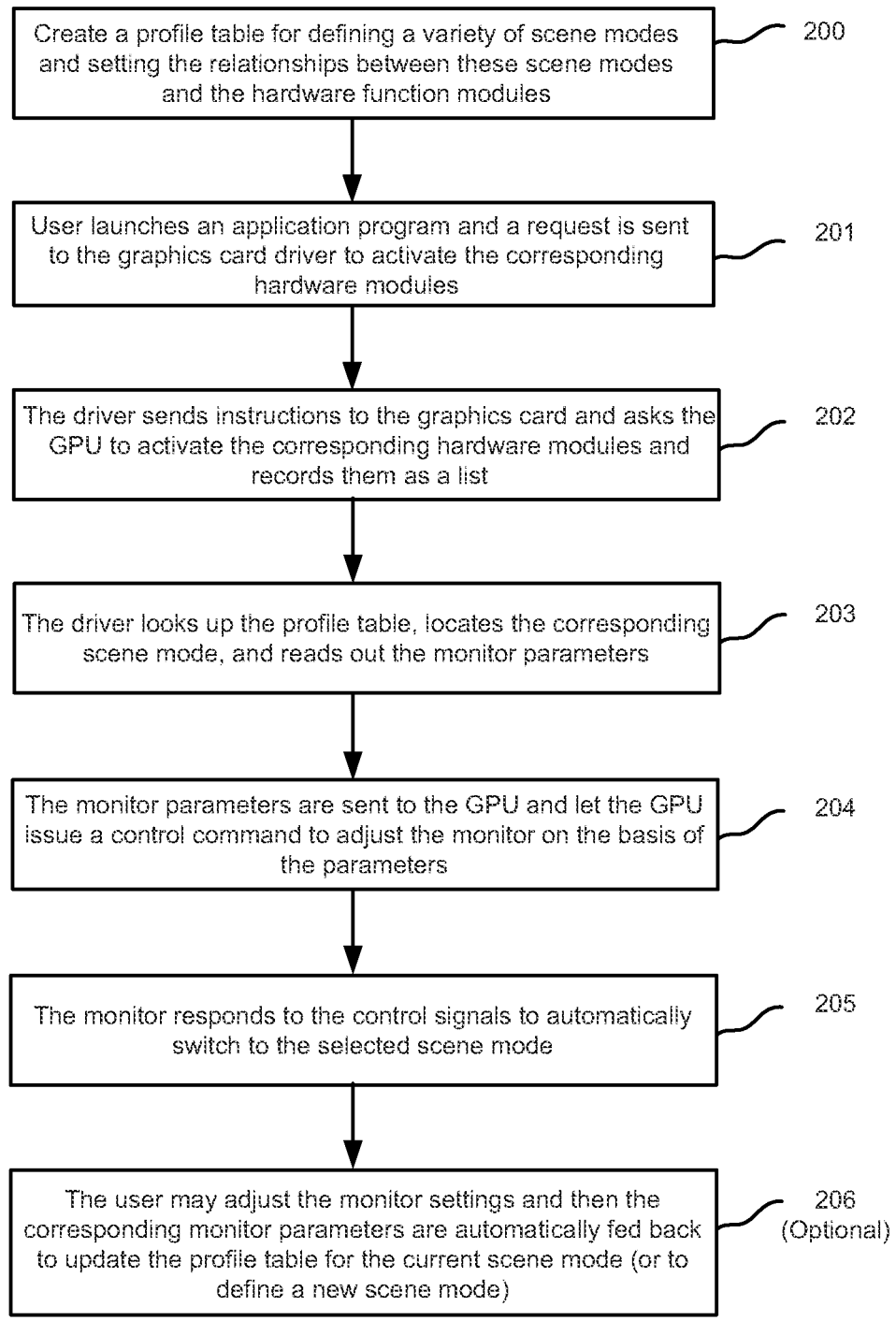
FIG. 2 is a flowchart showing an example method for automatically switching monitor scene modes according to an embodiment of the present invention.

Referring next to FIG. 2, shown is a flowchart illustrating an example method for automatically switching monitor scene modes according to an embodiment of the present invention.

At step 200, a profile table for defining a plurality of scene modes may be created and the relationships between these scene modes and the hardware function modules of the GPU are then defined. In this profile table, each scene mode may have one or more monitor parameters corresponding to one or more related function modules of the GPU. This correspondence is determined according to which function modules will be activated under a certain scene mode. For example, when the user launches a 3D game, the 3D game engine will be activated to perform the function of 3D graphics acceleration. Then a scene mode called "3D game scene mode" will be defined. This scene mode corresponds to the hardware module of the 3D acceleration engine called by the GPU. When a 3D game is shown on the monitor, high brightness and contrast may be needed in order to clearly present the graphic detail in the 3D game to the user. Therefore, a group of parameters for adjusting the monitor, e.g., 80% of the full brightness and 100% of the full contrast, will be set corresponding to the 3D game scene mode. In such a way, the 3D game scene mode has been created and defined. In a similar way, other scene modes such as, for example, "DVD play scene mode", "HD movie scene mode" and "Internet browsing scene mode" may be also created and defined in the profile table.

Some scene modes may not require launching of any specific hardware module by the GPU. For example, when the user launches plain text processing software application (e.g., Microsoft Word®) to draft a document, the GPU will only provide basic graphic performance without enabling any hardware acceleration engines. Therefore, this kind of scene mode may be defined as a "plain text scene mode" and perhaps may not include corresponding hardware modules in the GPU. This "plain text scene mode" and other similar scene modes, for example, will depend only on the normal graphics processing capabilities of the GPU. Shown is an exemplary profile table defined according to the process above.

TABLE 1

An exemplary profile table for a variety of scene modes

| Scene Modes | Monitor Parameters | Hardware Modules Required |
|---|---|---|
| 3D Game | 80% of the full brightness, 100% of the full contrast | 3D acceleration engine |
| DVD Movie | 80% of the full brightness, 80% of the full contrast, 80% of the full color saturation | Video engine |
| HD Movie | 80% of the full brightness, 80% of the full contrast, 100% of the full color saturation | HD video engine |
| Internet Browsing | 50% of the full brightness, 50% of the full contrast | Flash playing engine |
| Plain Text | 50% of the full brightness, 50% of the full contrast | None |
| . . . | . . . | . . . |

In one example, the profile table may be defined and preset by the manufacturer of the graphics card and/or GPU and embedded in the driver programs (referred to as drivers herein) for the graphics card. When the graphics card along with its driver is installed into a computer, the driver will write the above profile table onto the hard disk of the computer. Then the profile table can be called and utilized by the driver at any given time later. It will be appreciated by those skilled in the art that the profile table may be stored in other places, for example, in a memory of the graphics card.

Alternatively, the profile table may be a rewritable file that can be defined separately by the users as desired. It is also possible for the user to change the profile table by adjusting buttons arranged on the monitor to obtain a desired display effect. Such a process is explained further below.

From step 201 to step 205, shown is a process of how the profile table is used to select and switch a scene mode for the monitor automatically. At step 201, the user may launch an application program, e.g., a 3D game, an HD movie or an Internet browser. The launched application program will then send a request to the graphics card driver to activate the corresponding hardware modules in the GPU, e.g. 3D game engine or HD video engine, in order to display the content that the application wants to show on the monitor.

At step 202, the driver will send an instruction to the graphics card and ask the GPU to activate the corresponding hardware modules. At the same time, the driver is aware of which of the hardware modules inside the GPU have been activated and have started to operate, and then records them as a list. On the basis of the hardware modules list, at step 203, the driver will access the storage device (e.g. hard disk or memory) to look up the stored profile table and locate the corresponding scene mode having the same hardware modules as those in the list. After finding the scene mode, a group of monitor parameters including but not limited to the brightness, contrast, color saturation, etc., as listed in the profile table and corresponding to the scene mode will be automatically read.

At step 204, the read group of monitor parameters will be sent to the GPU by the driver as an instruction to let the GPU issue a corresponding control command to adjust the monitor on the basis of these monitor parameters. In response to the group of monitor parameters being sent to the GPU, at step 205 the GPU will automatically send a set of corresponding control signals to the monitor via an interface port connecting the graphics card and the monitor. The monitor will then respond to the control signals by switching to the brightness, contrast and color saturation, etc. corresponding to the parameters under the selected scene mode, which completes the process of selecting and switching a scene mode. The above process of selecting and switching a scene mode is performed automatically between the GPU and the monitor under the control of the graphics card driver without need for any manual control from the user.

The communication channel between the monitor and the graphics card may be configured as a two-way channel through which the signal may be transmitted back and forth. Optionally, at step 206, after the monitor has been switched automatically to a selected scene mode according to a currently running application program as described above, the user may adjust the monitor settings and then the corresponding monitor parameters are automatically fed back to update the profile table for the current scene mode (or to define a new scene mode). For example, the user may push the buttons arranged on the monitor to adjust the brightness, color saturation and contrast, etc. as desired and the resulting parameters will be sent back to the GPU through the two-way channel and be automatically written back to the profile table. The new monitor parameters may either update the old setting of the scene mode or be used to create and define a new scene mode as an option provided to the user. Also, if a computer and its monitor are to be used by multiple users, each user may create and define their own profile table based on the particular user's preference.

Figure 3:
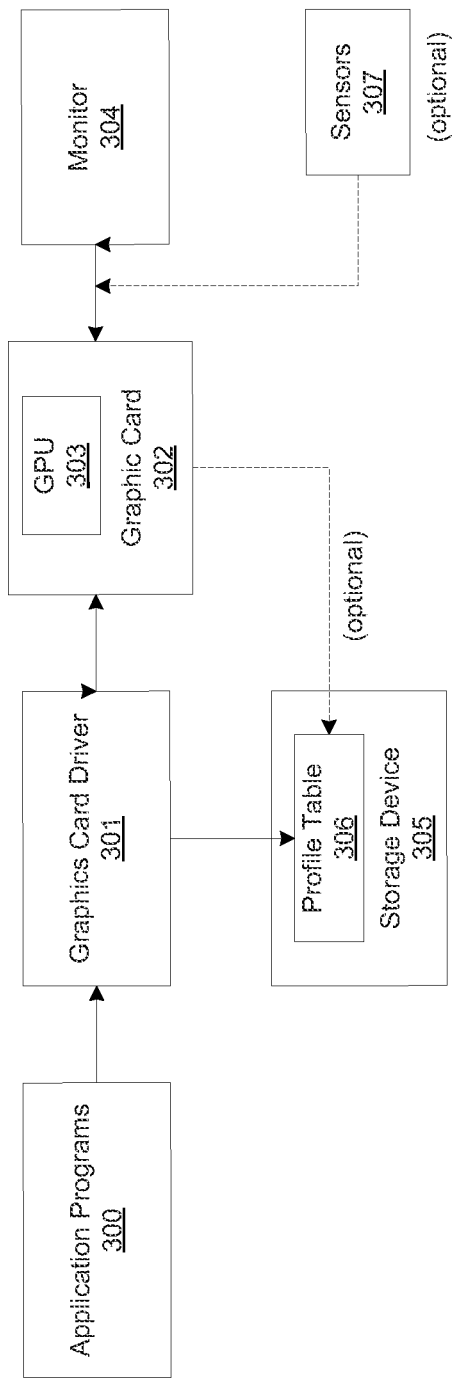
FIG. 3 is a block diagram illustrating an example of a plurality of software and hardware modules involved in the process of automatically switching monitor scene modes according to an embodiment of the present invention.

Referring next to FIG. 3, shown is a block diagram comprising a plurality of software and hardware modules involved in the process of selecting and switching a scene mode as illustrated in FIG. 2. The lines with arrowheads in FIG. 3 show the direction of the control signal/instruction/command transmitted between these modules.

Firstly, an application program 300 may be launched by a user. The application program 300 may then send a request to a graphics card driver 301 (e.g. via Application Program Interface (API) to activate the corresponding hardware modules (e.g. a 3D game engine or an HD video engine) in the GPU 303 in order to display the content that the application program 300 wants to show on the monitor 304. Next, the driver 301 will send one or more instructions to the graphics card 302 asking the GPU 303 to activate the corresponding hardware modules. At the same time, the driver 301 is aware of which hardware modules inside the GPU 303 have been activated and have started to operate. The GPU 303 then records identifiers of the hardware modules in a list. On the basis of the hardware modules list, the driver 301 will access the storage device 305 to look up the preset profile table 306 and locate and select the corresponding scene mode associated with the hardware modules in the list. After finding the scene mode, a group of monitor parameters including but not limited to the brightness, contrast and color saturation as listed in the selected scene mode in the profile table will be read by the driver 301 and then sent to the GPU 303 to adjust the monitor 304 accordingly. To make the corresponding adjustments, the GPU 303 will issue a corresponding control command to the monitor 304 for adjusting the monitor based on the sent parameters. The monitor 304 will then respond to the control command to set the brightness, contrast and color saturation, etc. corresponding to the parameters under the selected scene mode.

Additionally, as shown by the dotted line from the graphics card 302 to the profile table 306 in FIG. 3, after the monitor has been switched automatically to a selected scene mode according to a currently running application program as described above, the user may adjust the monitor settings and then the corresponding monitor parameters are automatically fed back to update the profile table for the current scene mode (or to define a new scene mode). The resulting parameters may be sent back to the GPU through a two-way channel between the graphics card 302 and the monitor 304, and then be written back to the profile table 306 to overwrite the setting of the scene mode, or create a new scene mode at the user's discretion.

As another optional function, the monitor and/or GPU may be provided with or operably connected to a sensor 307 to sense the environment illumination and to automatically change the monitor parameters based on the sensed external signals. This is especially useful for a mobile device (e.g., notebook computer) that may be used in situations with varying environment illumination.

The communication channel between the monitor and the graphics card may use any suitable display communication interface. Some examples of suitable display communication interfaces commonly known and used in the art include: Video Graphics Array (VGA), Digital Video Interface (DVI), High Definition Multimedia Interface (HDMI) and Auxiliary (AUX) channels. The monitor parameters transferred via the above communication channel may be in any suitable data format. An example of a suitable data format commonly known and used in the art is the Extended display identification data (EDID) format.

It is noted that the foregoing examples have been provided merely for the purposes of explanation and are in no way to be construed as limiting of the present invention. While the invention has been described with reference to various embodiments, it is understood that the words which have been used herein are words of description and illustration, rather than words of limitations. Further, although embodiments have been described herein with reference to particular means and materials, the invention is not intended to be limited to the particulars disclosed herein; rather, the invention extends to all functionally equivalent structures, methods and uses, such as are within the scope of the appended claims. Those skilled in the art, having the benefit of the teachings of this specification, may effect numerous modifications thereto and changes may be made without departing from the scope and spirit of the invention in its aspects.

What is claimed is:

1. A method comprising:
    sending a request, by a driver implemented on a computer processor, to activate at least one required hardware module of a plurality of hardware modules inside of a graphics processing unit (GPU), wherein the request is based on a requirement of a launched application program;
    recording, in a list, the at least one activated hardware module inside of the GPU, such that the list includes the at least one activated hardware module inside of the GPU;
    accessing a profile table that is stored in computer memory for defining a plurality of scene modes, each of the scene modes having at least one monitor parameter corresponding to at least one hardware module of the plurality of hardware modules inside of the GPU;
    locating, within the profile table, a scene mode based on the list;
    reading, from the profile table, the corresponding at least one monitor parameter previously associated with the scene mode; and
    transmitting the read at least one monitor parameter to the GPU to automatically adjust a monitor to the scene mode by changing monitor settings according to the read at least one monitor parameter.

2. The method of claim 1, further comprising creating and storing the profile table in the computer memory.

3. The method of claim 1, further comprising:
    receiving manual adjustments to monitor settings; and
    using the received manual adjustments to perform at least one of:
        updating monitor parameters within the profile table corresponding to a current scene mode, and
        creating a new scene mode within the profile table.

4. The method of claim 1, further comprising automatically adjusting monitor settings by sensing an environmental illumination.

5. The method of claim 1, wherein the scene mode is associated with playing a type of content, the type of content including at least one of 3 dimensional (3D) video game content, digital video disc (DVD) content, high definition (HD) video content, general Internet browsing content, and text processing content.

6. The method of claim 1, wherein the at least one activated hardware module includes at least one of a 3 dimensional (3D) video game engine module, a high definition (HD) video engine module, and a video engine module.

7. The method of claim 1, wherein the corresponding monitor parameters include at least one of brightness, chromaticity, contrast, and white balance.

8. The method of claim 1, wherein the transmitting comprises sending commands associated with the at least one monitor parameter to the monitor via a two-way channel on which manual adjustments to monitor settings may be sent to the graphics processing unit (GPU) to update monitor parameters of a current scene mode stored in the profile table.

9. The method of claim 8, wherein the two-way channel includes an interface port connecting the GPU and the monitor, wherein the GPU is operable to, in response to receiving the corresponding monitor parameters at the GPU, transmit to the monitor over the interface port the commands associated with the corresponding monitor parameters, and wherein the interface port connecting the GPU and the monitor includes at least one of Video Graphics Array (VGA), Digital Video Interface (DVI), High Definition Multimedia Interface (HDMI), and Auxiliary (AUX) channels.

10. The method of claim 1, wherein the at least one required hardware module requested to be activated is a subset of the plurality of hardware modules inside of the GPU.

11. The method of claim 1, wherein the located scene mode in the profile table includes all activated hardware modules inside of the GPU that are in the list.

12. The method of claim 1, wherein the request is sent to the driver by the launched application program, such that the launched application program requests the activation of the at least one required hardware module of the plurality of hardware modules inside of the GPU for displaying content of the launched application program.

13. A system comprising:
    a profile table stored in computer memory for defining a plurality of scene modes, each of the scene modes having at least one monitor parameter corresponding to at least one hardware module of a plurality of hardware modules inside of a graphics processing unit (GPU);
    a driver implemented on a computer processor configured for:
        sending a request to activate at least one required hardware module of the plurality of hardware modules inside of the GPU, wherein the request is based on a requirement of a launched application program,
        recording, as a list, the at least one activated hardware module inside of the GPU, such that the list includes the at least one activated hardware module inside of the GPU,
        accessing the profile table,
        locating a scene mode in the profile table based on the list, and
        reading the corresponding at least one monitor parameter associated with the scene mode from the profile table; and
    a channel for transmitting the read at least one monitor parameter to the GPU to automatically switch a monitor to the scene mode by changing monitor settings according to the read at least one monitor parameter.

14. The system of claim 13, further comprising:
    an external adjust device for adjusting the monitor parameters externally by users, wherein the driver is operable for using the monitor parameters to perform at least one of:
        updating the profile table, and
        creating a new profile table.

15. The system of claim 13, further comprising a sensor in communication with the graphics processing unit for sensing an environmental illumination based on which the driver is operable for making an automatic adjustment to one of the monitor parameters.

16. The system of claim 13, wherein the scene mode is associated with playing a type of content, the type of content including at least one of 3 dimensional (3D) video game content, digital video disc (DVD) content, HD video content, general Internet browsing content, and text processing content.

17. The system of claim 13, wherein the at least one activated hardware module includes at least one of a 3 dimensional (3D) video game engine module, a high definition (HD) video engine module, and a video engine module.

18. The system of claim 13, wherein the read at least one monitor parameter includes at least one of brightness, chromaticity, contrast, and white balance.

19. The system of claim 13, wherein the channel is a two-way channel.

20. The system of claim 13, wherein the profile table is configurable based on user preferences.

21. The system of claim 13, wherein the profile table defining the plurality of scene modes is written to a hard disk of the system when the driver is installed into the system, and the profile table is modifiable by a user manipulating controls on the monitor.

22. A non-transitory computer readable medium having computer-executable instructions thereon, the computer-executable instructions comprising instructions for:

sending a request, by a driver implemented on a computer processor, to activate at least one required hardware module of a plurality of hardware modules inside of a graphics processing unit (GPU), wherein the request is based on a requirement of a launched application program;

recording, in a list, the at least one activated hardware module inside of the GPU, such that the list includes the at least one activated hardware module inside of the GPU;

accessing a profile table that is stored in computer memory for defining a plurality of scene modes, each of the scene modes having at least one monitor parameter corresponding to at least one hardware module of the plurality of hardware modules inside of the GPU;

locating, within the profile table, a scene mode based on the list;

reading, from the profile table, the corresponding at least one monitor parameter previously associated with the scene mode; and transmitting the read at least one monitor parameter to the GPU to automatically adjust a monitor to the scene mode by changing monitor settings according to the read at least one monitor parameter.

* * * * *